(12) United States Patent
Zinner

(10) Patent No.: US 11,546,074 B2
(45) Date of Patent: Jan. 3, 2023

(54) CLOCK TOPOLOGY IN AN ETHERNET NETWORK

(71) Applicant: CONTINENTAL AUTOMOTIVE GMBH, Hannover (DE)

(72) Inventor: Helge Zinner, Munich (DE)

(73) Assignee: Continental Automotive GmbH, Hannover (DE)

( * ) Notice: Subject to any disclaimer, the term of this patent is extended or adjusted under 35 U.S.C. 154(b) by 117 days.

(21) Appl. No.: 17/262,954

(22) PCT Filed: Jul. 24, 2019

(86) PCT No.: PCT/EP2019/069897
§ 371 (c)(1),
(2) Date: Jan. 25, 2021

(87) PCT Pub. No.: WO2020/020936
PCT Pub. Date: Jan. 30, 2020

(65) Prior Publication Data
US 2021/0314078 A1   Oct. 7, 2021

(30) Foreign Application Priority Data

Jul. 25, 2018 (DE) .................... 10 2018 212 346.2

(51) Int. Cl.
*H04J 3/06* (2006.01)
*H04L 12/40* (2006.01)

(52) U.S. Cl.
CPC .......... *H04J 3/0679* (2013.01); *H04J 3/0658* (2013.01); *H04L 12/40* (2013.01); *H04L 2012/40273* (2013.01)

(58) Field of Classification Search
CPC ...... H04J 3/0679; H04J 3/0658; H04J 3/0667; H04L 12/40; H04L 2012/40273
See application file for complete search history.

(56) References Cited

U.S. PATENT DOCUMENTS

2004/0068709 A1* 4/2004 Hojat .................... G06F 30/394
716/122
2011/0158120 A1* 6/2011 Hamasaki ............. H04J 3/0688
370/252

(Continued)

FOREIGN PATENT DOCUMENTS

EP          2677690 A1    12/2013
WO     2017130034 A1     8/2017

OTHER PUBLICATIONS

Sardari, A., et al., "Development of Cross Domain Control Unit Functions", Apply & Innovate, 2016, pp. 1-14, Karlsruhe, URL: https://ipg-automotive.com/fileadmin/user_upload/content/Download/Media/Presentation/Apply_Innovate_2016_Bosch_Sardari.pdf.

(Continued)

*Primary Examiner* — Kiet Tang
(74) *Attorney, Agent, or Firm* — Laurence A. Greenberg; Werner H. Stemer; Ralph E. Locher

(57) ABSTRACT

A method establishes an improved clock topology for a computation system, where the computation system is a network of nodes, and where multiple nodes are capable of being a grandmaster clock source. The method includes sequentially selecting each selectable node as an acting grandmaster node, the acting grandmaster node sending announce messages, each node with a determinative communication requirement extracting topology information from the announce messages. The above steps are repeated with another node until each selectable node has been an acting grandmaster. The method then includes selecting the clock source based on the best clock topology for the set of nodes with determinative communication requirements.

15 Claims, 15 Drawing Sheets

(56) References Cited

U.S. PATENT DOCUMENTS

| | | | | |
|---|---|---|---|---|
| 2013/0227008 | A1* | 8/2013 | Yang | H04J 3/0667 |
| | | | | 709/204 |
| 2015/0331422 | A1* | 11/2015 | Hartung | G05D 1/021 |
| | | | | 701/23 |
| 2016/0020863 | A1 | 1/2016 | Kim et al. | |
| 2016/0149692 | A1* | 5/2016 | Kim | H04L 12/4625 |
| | | | | 370/503 |
| 2017/0323455 | A1 | 11/2017 | Bittan et al. | |
| 2018/0145821 | A1* | 5/2018 | Pietiläinen | H04J 3/0641 |
| 2018/0212863 | A1* | 7/2018 | Akcan | H04L 41/08 |

OTHER PUBLICATIONS

"Audio Video Bridging Task Group", 2017, Institute of Electrical and Electronics Engineers, Inc., URL: https://www.ieee802.org/1/pages/avbridges.html.

"802.1AS—Timing and Syncrhonization", 2017, Institute of Electrical and Electronics Engineers, Inc., URL: https://www.ieee802.org/1/pages/802.1as.html.

"E/E-Architecture in a Connected World", 2017, Bosch.

Jesse, B., "Global Time Synchronization in an Automotive Ethernet Network—Everything Done?", Vector, Oct. 15, 2015, pp. 1-22, URL: https://docplayer.net/32472142-Global-time-synchronization-in-an-automotive-ethernet-network-everything-done-v.html.

Ziehensack, M., "Automotive Ethernet ECU Communication Architecture for Autonomous Driving", Elektrobit, Jun. 5, 2015, URL: https://d23rjziej2pu9i.cloudfront.net/wp-content/uploads/2015/06/22092907/ECU_Communication_Architecture_for_Autonomous_Driving.pdf.

Jesse, B., "Zeitsynchronisation in Automotive-Ethernet-Netzen", Vector, 2017, URL: https://assets.vector.com/cms/content/know-how/_technical-articles/Ethernet_Timesync_Automobil-Elektronik_201608_PressArticle_DE.pdf.

Pyka, S., "Future of Mobility", Bosch, 2016, URL: https://www.a3ps.at/sites/default/files/conferences/2014/papers/5_bosch_pyka.pdf.

"Ethik-Kommission: Leitlinien fuer autonomes und vernetztes Fahren", www.Merkur.de, Jun. 20, 2017, URL: https://www.merkur.de/politik/ethik-kommission-leitlinien-fuer-autonomes-und-vernetztes-fahren-zr-8416523.html.

"Ganzheitliche Vernetzung", Continental AG, URL: https://www.continental-automotive.com/de-DE/Passenger-Cars/Technology-Trends/Holistic-Connectivity-(1).

"Precision Time Protocol", Wikipedia, 2020, URL: https://en.wikipedia.org/wiki/Precision_Time_Protocol.

* cited by examiner

CLOCK TOPOLOGY IN AN ETHERNET NETWORK

BACKGROUND OF THE INVENTION

Field of the Invention

The instant disclosure relates to Ethernet-based communication networks, especially as used in the automotive environment. It may be desirable that Electronic Control Units (ECU) in an automobile be able to reconsider and improve the clock topology of the network to which they are attached. It may be desirable that an ECU can autonomously evaluate which potential clock source node would provide the best performance as the central or common reference clock.

Automotive vehicle manufacturers (OEM's) and Tier-1 suppliers to the automotive industry are preparing the next generation of architecture for automotive controllers or electronic control units, ECU's. One development is the so-called "Zone-Oriented Architecture", in which ECU's are grouped into zones, such as a front-right-door zone. A difference from previous architectures is that controllers are located at certain physical or spatial positions in order to best gather data from sensors positioned there. For example, an ECU which collects data from a sensor in the right front door may be positioned in the right front door zone.

Also under consideration is the localization or distribution of software execution for features and applications, to other controllers and processors. Such localization or distribution may be part of an optimization, and may also be used in the event of an error or a failure, e.g. of an ECU. Localization may occur due to physical changes, such as adding new nodes to a network in the course of adding or repairing functionality. Localization may also occur due to recurring events such as a partial power down of the network to save energy, such as with partial networking. This localization or distribution is referred to as dynamic migration, or just migration. Series production for the dynamic migration of software on other ECUs/processors (within the car) is expected soon.

Ethernet may be the network of choice for connecting ECU's as nodes in a network. Ethernet technology is becoming ever more popular for the electrical systems of vehicles and supplier products. Use of Ethernet technology requires an effective synchronization or "clock" concept.

Existing Ethernet systems may use an implementation of the time synchronization standard IEEE 802.1AS. Two variants which have attracted particular attention are 802.1AS-rev failure and 802.1AS-rev time domain (the latter is a mandatory requirement for the former). Further protocols beyond the physical transfer standards include Ethernet AVB and its successor Ethernet TSN. Ethernet AVB has already been introduced for automobiles in series production. An essential substandard for Ethernet TSN and AVB is the time synchronization standard IEEE 802.1AS which is dependent on the main standard IEEE 802.1 for Higher Layer LAN Protocols (Bridging). Both standards use the Precision time Protocol (PTP) of IEEE 1588 to establish a common timebase in an Ethernet network, "https://en.wikipedia.org/wiki/Precision Time Protocol".

PTP defines a master/slave hierarchy of clocks, along with a best timing clock within an AVB or TSN network. The best clock, or "grandmaster", serves as the source or timebase for nodes in the particular network. Each ECU or µController can potentially be grandmaster if it has the necessary configuration. The Best Master Clock Algorithm (BMCA) can be used to identify the best time clock and propagate this information in the network. Cyclical announce messages send information about the best clock of a network such as an AVB cloud to neighbor nodes of IEEE 802.1AS-capable systems. The receiver of such a message compares this information to information it may already have about the characteristics of its clock, or information it may have received from another port. On the basis of these elements of information, a time synchronization spanning tree may be set up.

Announcements continue to be cyclically dispatched even after the list of nodes of the spanning tree has been established. This allows, on the one hand, the loss of a grandmaster to be compensated by the dynamic election of a new best clock. Likewise, new nodes added during runtime or during operation can also be taken into consideration.

A 802.1AS network configures and segments itself autonomously. Due to the cyclical implementation of the BMCA Best master Clock Algorithm, participant nodes may also be connected or removed during runtime, i.e. dynamically.

The clock topology may be an important consideration for the operation of a system. The path which the data takes from sender to receiver may differ and thus pose differing demands on the quality of the data and processing. For example, if sensor data (e.g. a camera) is only one step removed—i.e. has only one hop—to the recipient, then as compared to a multi-hop or multi-step topology there will be: lower latency, meaning more time for the generation of data or data processing; fewer security problems, because there are fewer points of attack on the shorter path; and more efficient data transfer, because less intermediate storage such as buffers or network resources must be made available en route, which also cuts costs. With knowledge of the architecture, an application can be optimized regarding communication channels, as well as regarding redundancy for reliability. Other advantages include: higher synchronization accuracy, leading to more quality in the sensor fusion; and better possibilities for failsafe communications, since with the help of topology information redundant paths can be identified and redundancy mechanisms such as IEEE 802.1CB can be used.

It is also desirable to allow platform-independent software assignment. Depending on the use case, it should be possible for software developers and architects to tailor the software or applications precisely to the requirements of the application. Software optimization may best take place at the end manufacturer or Original Equipment Manufacturer (OEM). Thus the software may become more platform and customer independent.

Likewise, for security reasons it may be desirable to identify all the nodes in the network and their local addresses. Using the appropriate techniques, each node may have the possibility to discover all transceivers or nodes in the vehicle. Thus foreign or unwanted data sources or ECUs can be identified.

A further consideration may be the transfer of functions or applications from one control unit to another. In future architectures a specific application may no longer be bound to a specific controller but rather be portable or transferrable to one or more different controllers. The right decision on transferring an application to a different controller can only be taken when topology information is known. Applications requiring low latency and high communication bandwidth should be executed if possible on neighboring controllers (minimizing the number of hops). Neighboring controllers can be identified using topology information to allow or improve software application localization and distribution.

Concurrent with the transfer of functions, it may be necessary or desirable to change the synchronization or clocking architecture. A function at one node which requires exact or close synchronization with a function at another node, for example a sensor processing operation at one node which uses sensor data from another node, may call for a reference clock collocated with one of the two referenced nodes. Thus it may be desirable to select a clock topology based on the desired use case.

Currently, information about the topology of a controller network of a vehicle, i.e. the connectivity structure of the controller network and the information on data to be exchanged, is typically provided manually or statically at a single point in time, during or after configuration of the vehicle. The topology information may include a specification of which node provides a reference clock. This topology information is not determined by dynamic software or individual applications, but rather is taken as a given, i.e. from the manufacturer. However, the growing complexity and diversity of variants in automotive production makes a static approach to topology information for each production car less efficient and less desirable.

Patent application EP 2677690 A1 addresses determining the network topology of a communications network including the clock topology. However the instant invention differs both in the protocol used and in the efficiency of the implementation for finding a topology which is to be selected for a given use case.

SUMMARY OF THE INVENTION

The instant invention offers the benefit of determining the desired use case and a corresponding clock topology between nodes, at any one of the time of delivery, end-of-line production, or dynamically such as after a software update such as an over-the-air (OTA) update. In fact, the instant invention may be applied at any time where a new application or use case is available. As described below, the inventive approach supports detecting e.g. an Ethernet network topology dynamically, including identifying the relevant nodes and clock sources in the network.

In one embodiment the instant invention makes use of time synchronization protocols to determine topology information. One embodiment changes the best clock (grandmaster) of a network dynamically, and uses the best clock for a decentralized exchange of the topology information, in particular information such as addresses, ports, and distance or "hops". Time synchronization messages are exchanged with information for determining the topology of the network. In particular, the distance to the best clock and its address may be determined. By having all eligible nodes become the active best clock in turn, all ECU's or Controllers may receive information about all the other participants of a network.

Based on information about the use case and the topology, including clock topology information, the network may select a node as clock source or grandmaster. The selection process may depend on characteristics such as the individual communication and synchronization needs between two or more nodes of the network in the given use case.

BRIEF DESCRIPTION OF THE SEVERAL VIEWS OF THE DRAWING

The invention is best understood with reference to the figures, as described below.

DETAILED DESCRIPTION OF THE INVENTION

The detailed description set forth herein is meant to give the person of skill an understanding of certain implementations of the instant invention.

Figure 1:
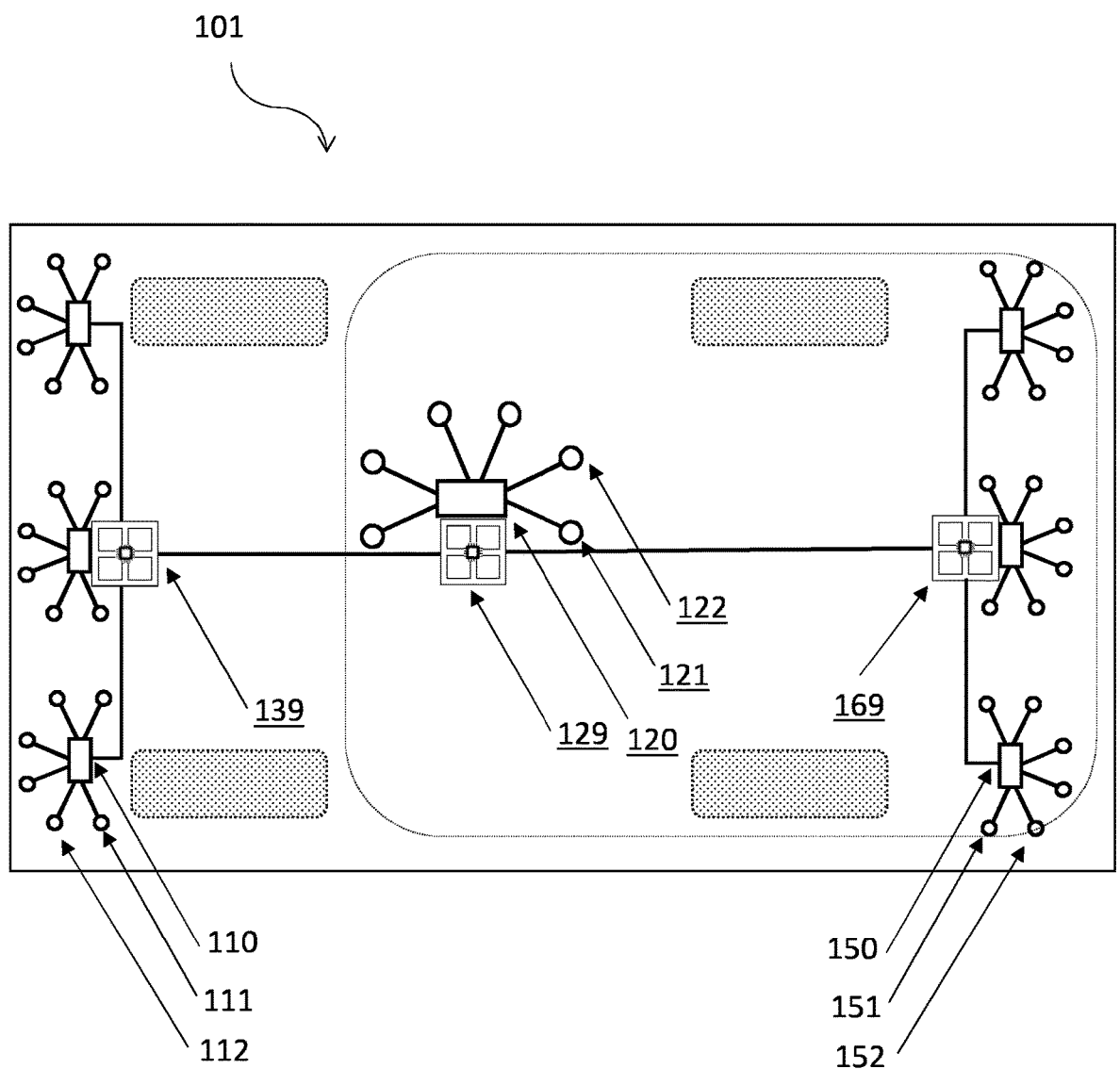
FIG. 1 shows a so-called "Zone-Oriented Architecture".

FIG. 1 shows an example of an automotive network 101. The network shows a zone-oriented architecture and includes nodes (111, 112, 121, 122, 151, 152), zone controllers (110, 120, 150) and server nodes (129, 139, 169). Zones include, for example, a front-left zone with controller 110 and nodes 111 and 112, or a rear-left zone with controller 150 and nodes 151 and 152. Server nodes with processing power include 129, 139 and 169. All nodes and controllers are interconnected with one or more data transfer busses, such as an automotive Ethernet, MOST, CAN in its multiple variants, etc.

It may be advantageous to transfer processing activities from sensors towards more central zone controller and server nodes. Server nodes may have ample processing power to handle more complex analyses, sensor data fusion, etc. Moving processing activities and software applications towards central resources may be particularly advantageous when the processing load is punctual or of varying intensity. Centralizing the processing may allow an averaging of the processing load, such that an application which requires particularly much processing at one time may share resources with a different application which requires particularly much processing at a different time.

In order to allow information or data from sensors to be processed at a different location, or to allow processing at a location which may change, it may be important to analyze the topology of the entire system. It may be important to identify delays in transferring data, and it may be important to understand the quality of the clock or clocks at the node which will be doing the processing. It may be important to understand the clock latency between the source node and the receiving or processing node, or the clock variance between the source node and the receiving or processing node.

It may be an important part of the processing to provide or embed timing information in the result of processing at a node. It may be important to know what timing difference there is or there may be between two or more source nodes and a receiving node, as for example might be necessary with data fusion.

Figure 2:
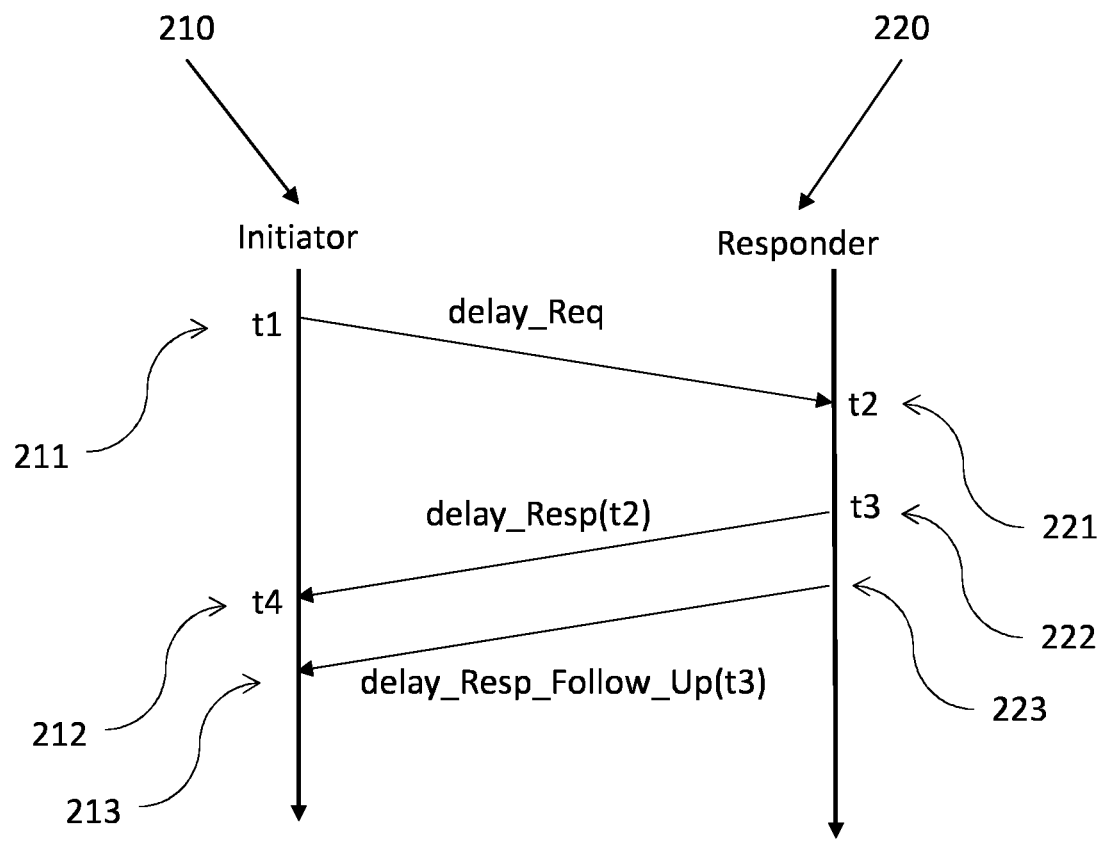
FIG. 2 shows measurement of the link delay.

FIG. 2 shows a protocol as might be used for measuring the link delay in a system which uses PTP (Precision Timing Protocol) as per IEEE 802.1AS. An initiator 210 may send a delay_Req message at time t1 shown as 211. The responder 220 may receive the delay_Req message at time t2 shown as 221. The responder may send a delay_Resp(t2) message shown as 222. The Initiator may receive the delay_Resp(t2) message at time t4 shown as 212. With this message the Initiator 210 can determine an absolute time delta from sending at t1 to receiving at t4, and also a relative time t2 when the Responder received the delay_Req message. The responder may send a delay_Resp_Follow_Up(t3) shown as 223, which is received at 213. With this message the Initiator 210 can determine an absolute time delta from the Responder 220 sending delay_Resp(t2) to the Responder sending delay_Resp_Follow_Up(t3). The Initiator may compare its receive time for the two messages at 212 and 213. With this, the Initiator will have information about the clock synchronization quality, such as Link delay and Neighbor Rate Ratio, and the transmission delay between the Initiator 210 and the Responder 220.

The information gathered with such a protocol gives information about the absolute quality of the links. This information may be qualified based on a use case. In particular, different nodes with different functions may pose different requirements for the quality of the link and what synchronization and delay is tolerable or desirable.

Figure 3:
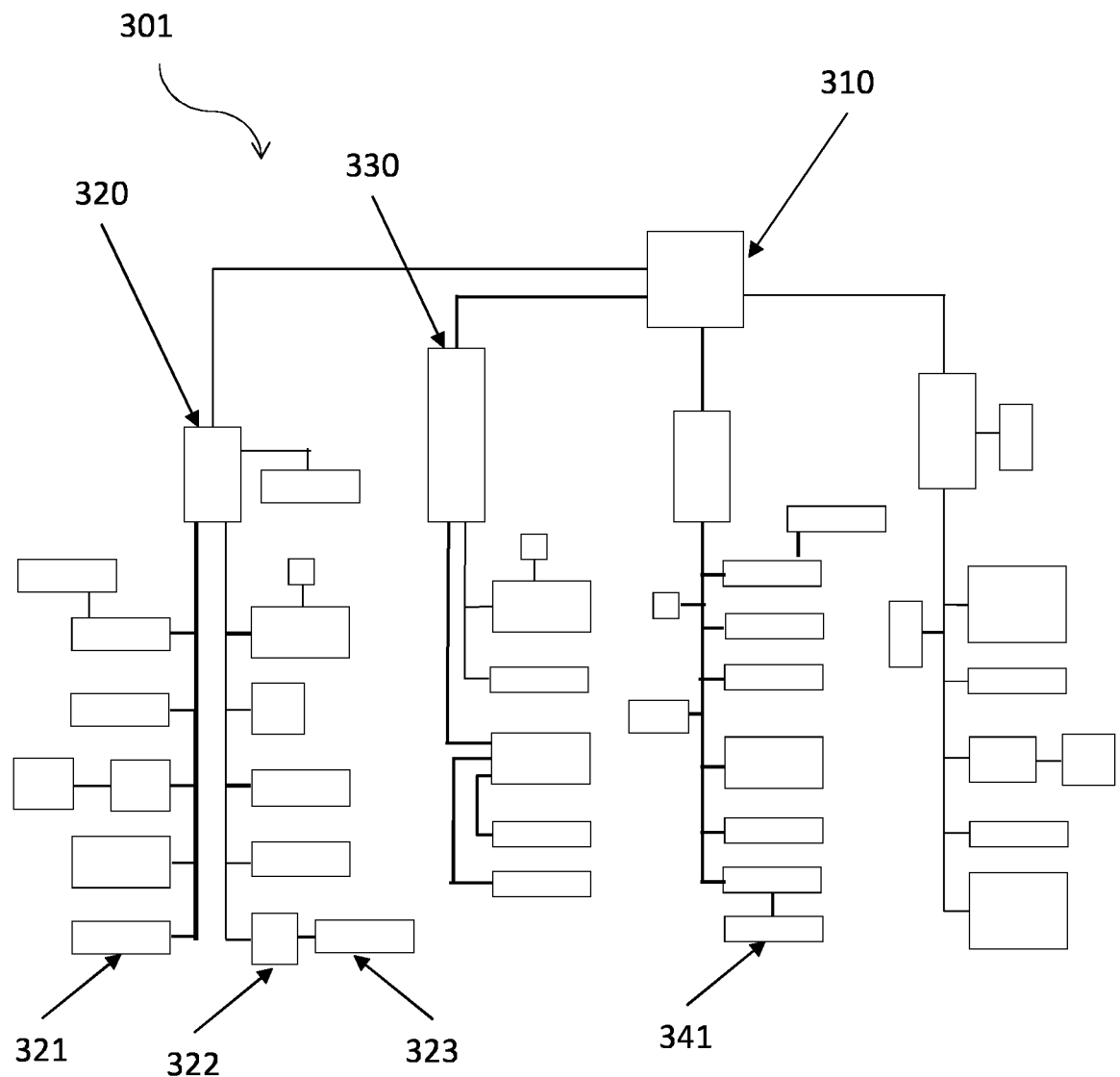
FIG. 3 shows one example of a complex automotive network as might be used for an embodiment of this invention.

FIG. 3 shows a network with a topology as might be found in an automotive environment. A central node or Gateway is shown as 310. This node may typically be the clock source or best clock, in addition to being a central node in the network topology. Other nodes may be end or leaf nodes, such as nodes 321, 323, 341. Certain nodes which are intermediate points in the network are shown as 320, 330. These may be connected between the Gateway 310 and end or leaf nodes such as nodes 321, 323, 341. Node 322 is also at an intermediate point between node 320 and node 323.

Figure 4A:
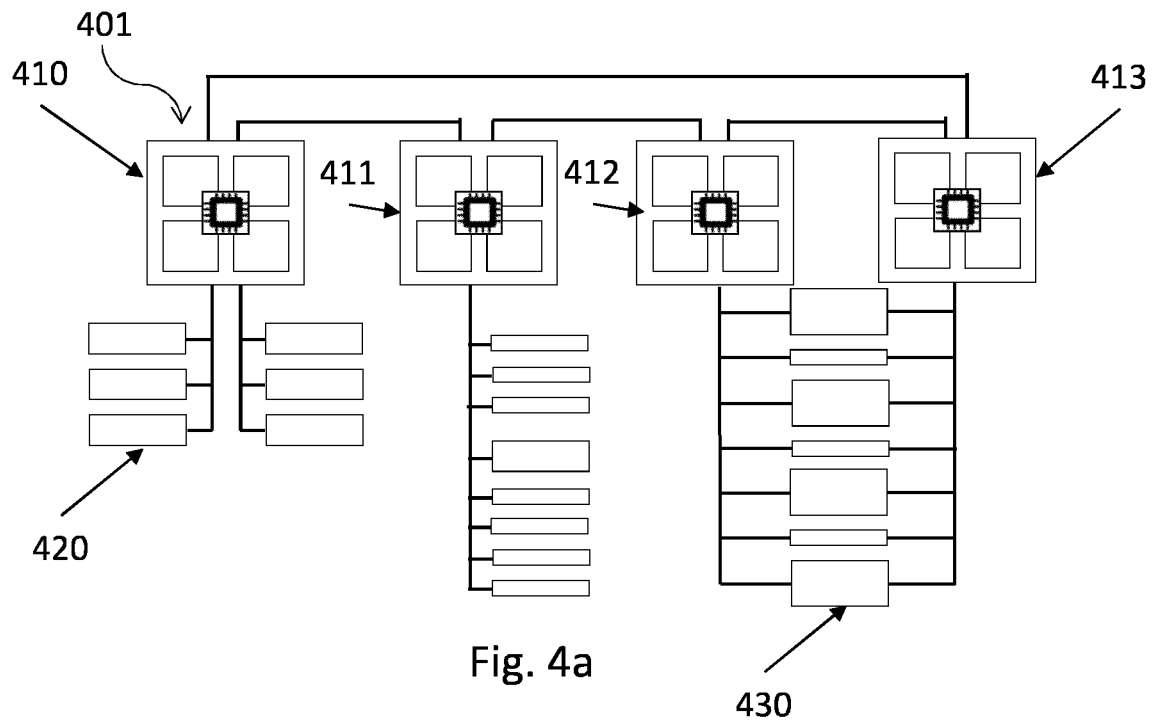
FIGS. 4a and 4b show two further examples of complex automotive networks as might be used for embodiments of this invention.

FIG. 4a shows another network with a topology as might be found in an automotive environment, for example for use in a zone-oriented architecture. Multiple server nodes 410, 411, 412, 413 are interconnected in a ring topology. End nodes such as node 420 may be associated with a sensor, and are connected to a server node. End node 430 is connected via two different connections to server nodes 412 and 413.

Multiple connections and even ring connections make topology recognition or discovery more difficult. There may be two or more paths between any two given nodes, over which the nodes are a different number of steps removed (different hop count).

Figure 4B:
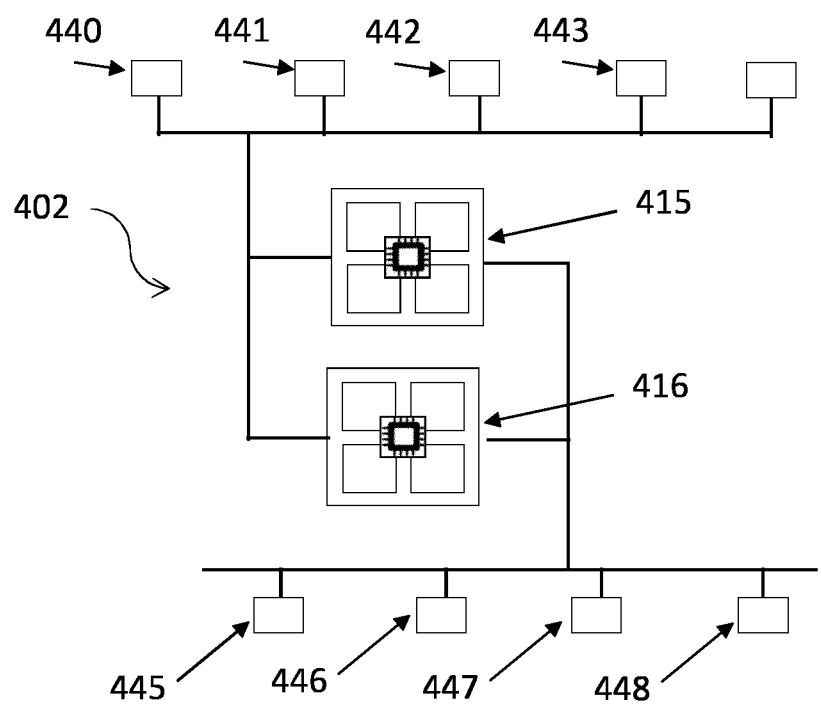

FIG. 4b shows yet another network with a topology as might be found in an automotive environment, for example for use in a zone-oriented architecture. Two server nodes 415, 416 are interconnected in a ring topology, which connections also connect to two groups of end or leaf nodes, such as nodes 440, 441, 442, 443 or nodes 445, 446, 447, 448. In case of a failure of a connection, it may be possible to reach, e.g. node 440 from server node 416 only through server node 415.

The topology of a network may also change in order to reduce power. Nodes 445 and 446 may power down to save power, and it may be desirable to consider the nodes as not part of the network topology while they are powered down. Thus the complete network of FIG. 4b will be considered a partial network while the specific power-saving configuration is active. It may then be desirable or necessary for one or both server nodes to recognize or discover the new topology.

FIGS. 3 and 4 show the challenges automotive manufacturers and suppliers are faced with today. The figures illustrate the multitude of various harness topologies variants which might be used for a specific vehicle model. If the clock configuration is static, then the Gateway may always be used as clock source, even if a different node would be a best clock.

For example, if clock communication between nodes 310 and 320 is the most critical for a given use case, then it may be advantageous for nodes 320 to become grandmaster or clock source, instead of Gateway 310.

Figure 5:
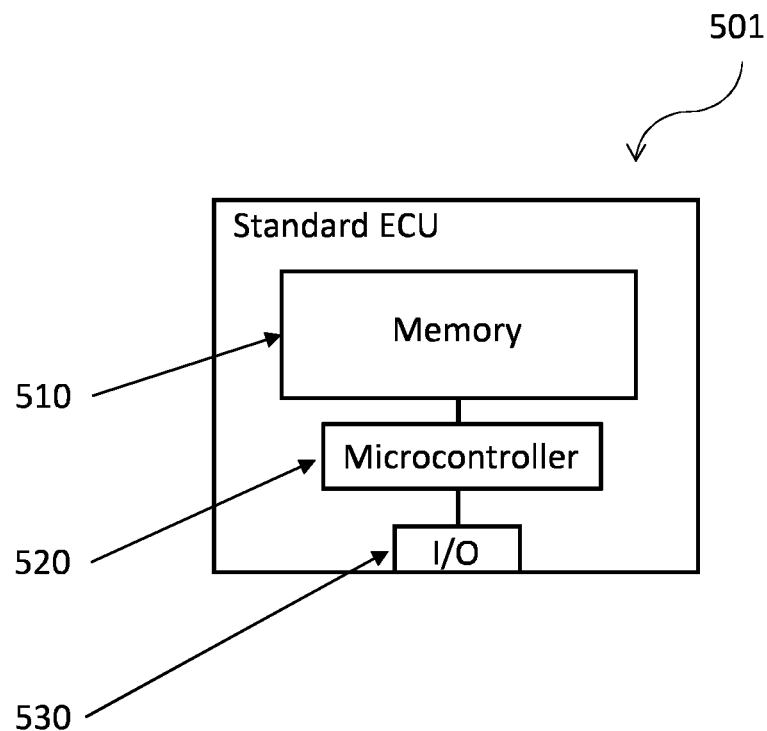
FIG. 5 shows a typical structure of an ECU as might be used as a node in an automotive network.

FIG. 5 shows a representative configuration for a simple node or ECU 501. The node includes a microcontroller 520, memory 510, and a communications interface shown as I/O 530 for communicating with other nodes in a network. Other embodiments of a node may have two or more interfaces 530. The interface may be an Ethernet interface, or a CAN bus, or a FlexRay or a wireless interface. The I/O interface 530 may correspond to one or more logical ports, which in turn correspond to a path to a next node in the network. The nodes which can be reached directly via a port correspond to those nodes which are one hop away or one step removed.

A node with multiple interfaces may use the same interface technology for each interface, or different interfaces may use different technology. For example, a node which operates as a gateway in a network may have one Ethernet interface, two CAN bus interfaces, and a LIN bus interface.

The ECU node 501 may include a precision clock generation capability which would allow it to provide synchronization information to other nodes in a network. It may have the ability to use the time reference from a GPS system, or have a high-precision clock oscillator or crystal clock. It may also include the capability to do clock correction for example due to the effects of temperature, ageing, etc. The node may have the capability to do timestamping of packets of information it sends, such that data sent includes information on the time at which the packet was prepared or was sent. Depending on the configuration of ECU 501, it may or may not be capable of being a clock source or grandmaster.

Figure 6:
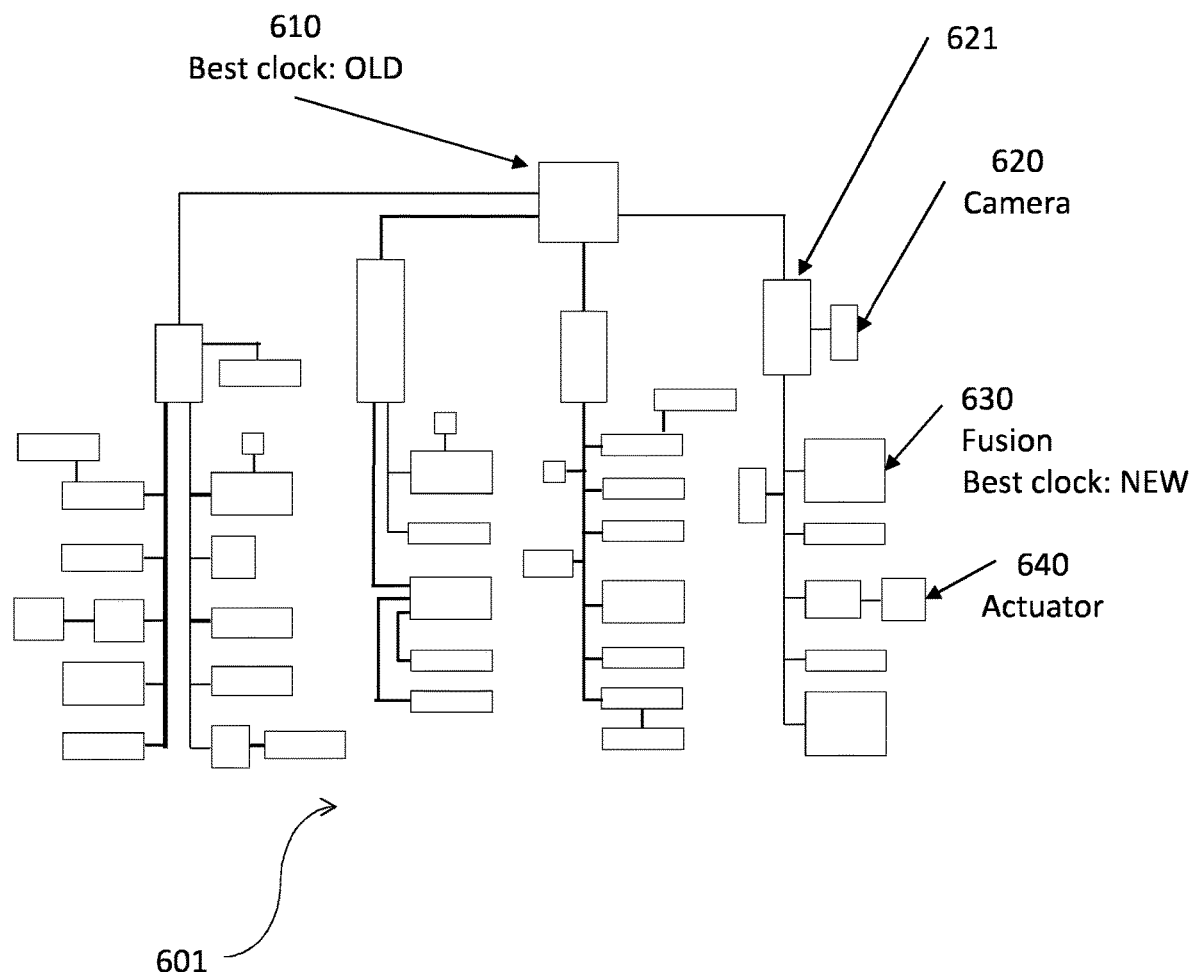
FIG. 6 shows an example of a change of use case and corresponding change of best clock.

FIG. 6 shows a network with a topology as might be found in an embodiment for an automotive environment. The network is shown in a state following a change of use case. Node 610 is the ECU which provided the clock signal to the other nodes for the preceding or "old" use case; it was the selected or defined best clock, also referred to as grandmaster. The network includes a node 621 which may be an ECU connected to a sensor node 620 as a camera. The node 621 is also connected to another node 630 which may be an ECU for sensor fusion. The node 621 is also connected indirectly to another node 640 which may be an actuator. The node 640 is connected to the old best clock node 610 via two intermediate nodes; in other words, it is 3 "hops" or steps removed from node 610. The nodes 620 and 630 are each 2 "hops" or steps removed from node 610 because they are each connected via an intermediate node 621.

If node 630 does fusion processing, then it may need close synchronization with the camera node 620 and the actuator node 640. Choosing node 630 as the best clock or grandmaster means that the nodes 620 and 640 are each two hops or steps removed from the clock source 630. Depending on the details of the communication between the camera node, the fusion node and the actuator node, one or more of the corresponding paths may be determinative, and thus require or make highly desirable a local grandmaster or best clock. Thus, for the new use case, node 630 may be selected as the best clock instead of node 610.

Figure 7:
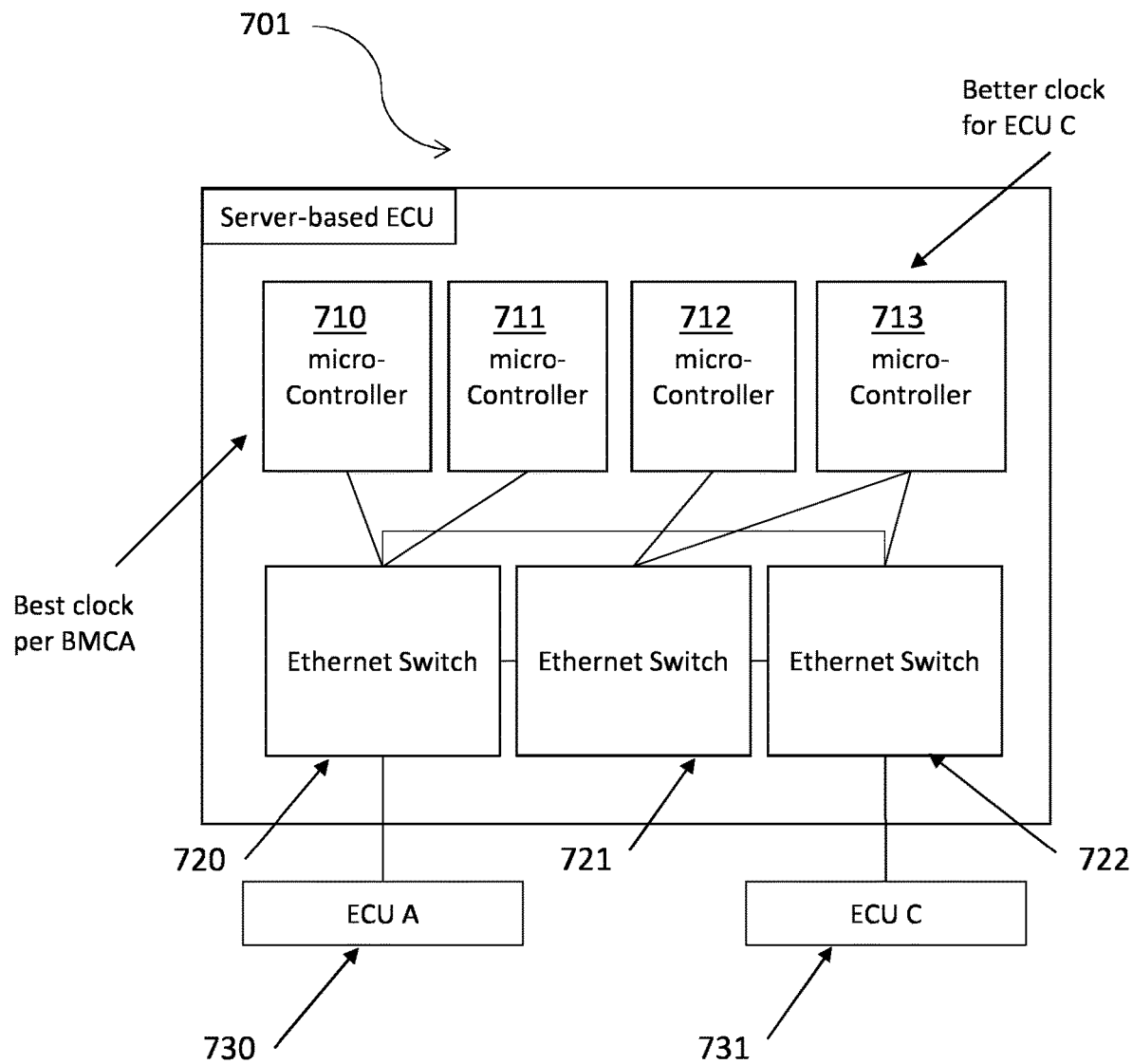
FIG. 7 shows a further example of a change of use case and change of best clock.

FIG. 7 shows another embodiment of the invention. In FIG. 7 a server-based ECU 701 comprises multiple microcontrollers 710, 711, 712, 713. The ECU also comprises a network with Ethernet switches 720, 721, 722. The Ethernet switches are connected amongst themselves. Microcontroller 710, for example, is connected to switch 720, while microcontroller 712 is connected to switches 721 and 722. Other ECU's 730 and 731 are also connected to switches 720 and 722 respectively. In this example the ECU's 730 and 731 are external to the server-based ECU 710. One or more of these connections may be determinative and make a local grandmaster or best clock be desirable or necessary.

If pre-established measures are used, such as the Best Master Clock Algorithm (BMCA) of the Precision time Protocol (PTP), as is described e.g. in the standard IEEE 802.1AS, the microcontroller 710 might be selected as the best clock. However, if ECU C as node 731 has timing requirements which are more important for a given use case, or which are to be used for selecting the best clock, then these might be determinative and might make the microcontroller 713 be the source selected as best clock.

FIG. 8 show the steps connected with a change of architecture such as might happen with a change of use case, in order to start operation with a best clock which might be different from the previous best clock. A change of best clock, or grandmaster, may be necessary or advantageous when the topology of the network changes, or when—due to functions which may be added or removed in the existing topology—there are different requirements for synchronization or clocking.

Figure 8A:
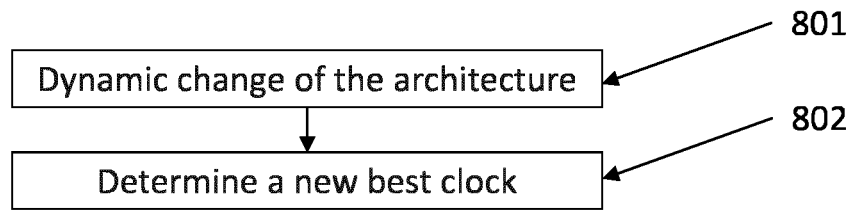
FIGS. 8a and 8b shows the steps for determining a new best clock and starting operation of the new use case.

FIG. 8a shows an overview of the steps. At 801 the network, or one or more nodes in the network, act to change the architecture of the network. Following this, in step 802, a new best clock is determined. This may be determined by one node on behalf of the nodes which compose the network, or it may be determined by a cooperative effort of multiple nodes in the network.

Figure 8B:
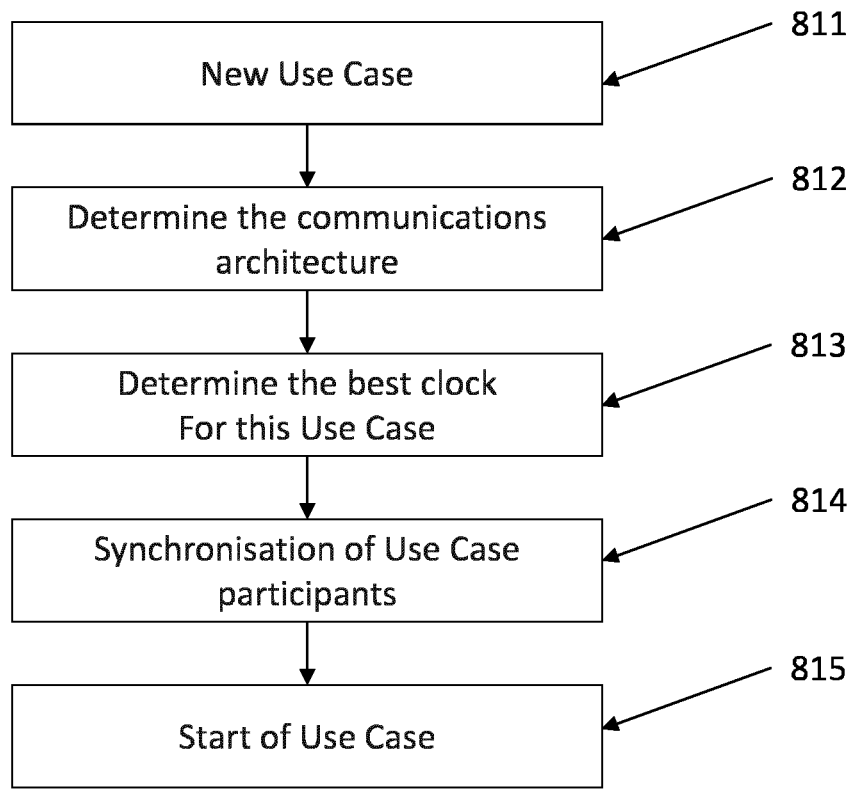

FIG. 8b shows more detail of the steps of an embodiment which are used to determine a new best clock. At 811 the network, or one or more nodes in the network, establish a new use case. At 812, the communications architecture corresponding to the new use case is established. This may be established by one node on behalf of the nodes which compose the network, or it may be determined by a cooperative effort of multiple nodes in the network, including by a cooperative effort of all nodes in the network which are capable of participating as new best clock. The communications architecture concerns particularly the communications for clocking and synchronization.

At 813 the best clock for the new use case is determined. This may also be done by one node on behalf of the nodes which compose the network, or it may be determined by a cooperative effort of multiple nodes in the network.

Once a best clock has been selected, the use case participants are synchronized at 814. The information on which node will be the best clock is disseminated to the whole network. The best clock may also be used to synchronize the nodes of the network. Following this, operation with the new use case begins at step 815.

Figure 9:
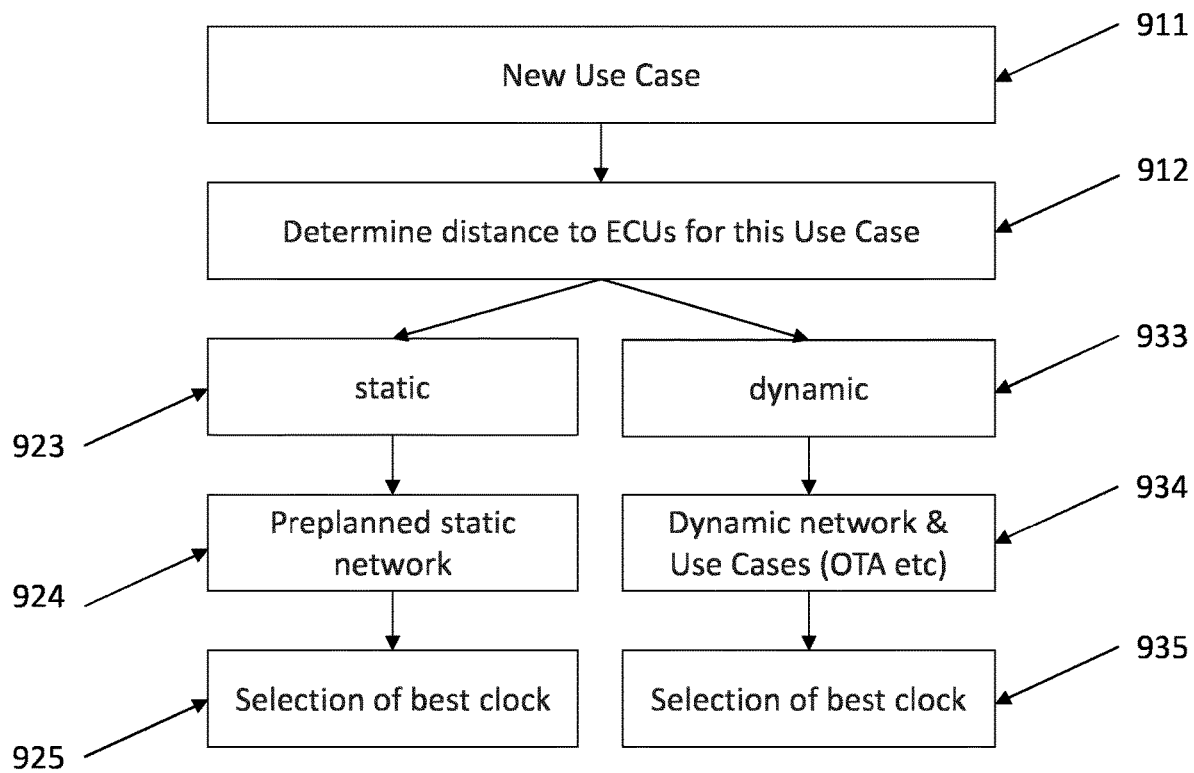
FIG. 9 shows two resolutions of best clock given a new use case.

FIG. 9 shows steps which may be used to select the best clock in different embodiments. The steps begin with the new use case at 911. At 912 the distance to different ECU's is determined with respect to an arbitrary node which might be the best clock, and for the new use case in question. The distance or distances may be established by one node on behalf of the nodes which compose the network, or it may be determined by a cooperative effort of multiple nodes in the network, including by a cooperative effort of all nodes in the network which are capable of participating. The distances are determined for the clocks and synchronization which are needed for operation with the new use case.

The evaluation and selection can then proceed following step 912 according to two different options. One is a static evaluation at 923, where the different clock sources and different synchronization requirements have already been identified. At step 924 a pre-established static network is chosen. For example, a table of different network configurations may be used, and the use case is used to select an entry in the table. Or a set of rules may be used based on the number or nodes and the number of hops between different nodes, according to the use case. The best clock may be determined at manufacture, or may be determined at some later time and the results saved. The statically determined best clock thus results in the selection of the best clock at step 925.

Alternatively, the evaluation and selection may then proceed at step 933 with a dynamic option. The topology of the network is then evaluated at 934 based on changes due to the use case, or also due to dynamic changes in the network such as over-the-air (OTA) software updates. The network topology may also change based on being powered down to save energy, such as with partial networking. The best clock is selected based on the current topology and requirements of the current use case at step 935.

Figure 10:
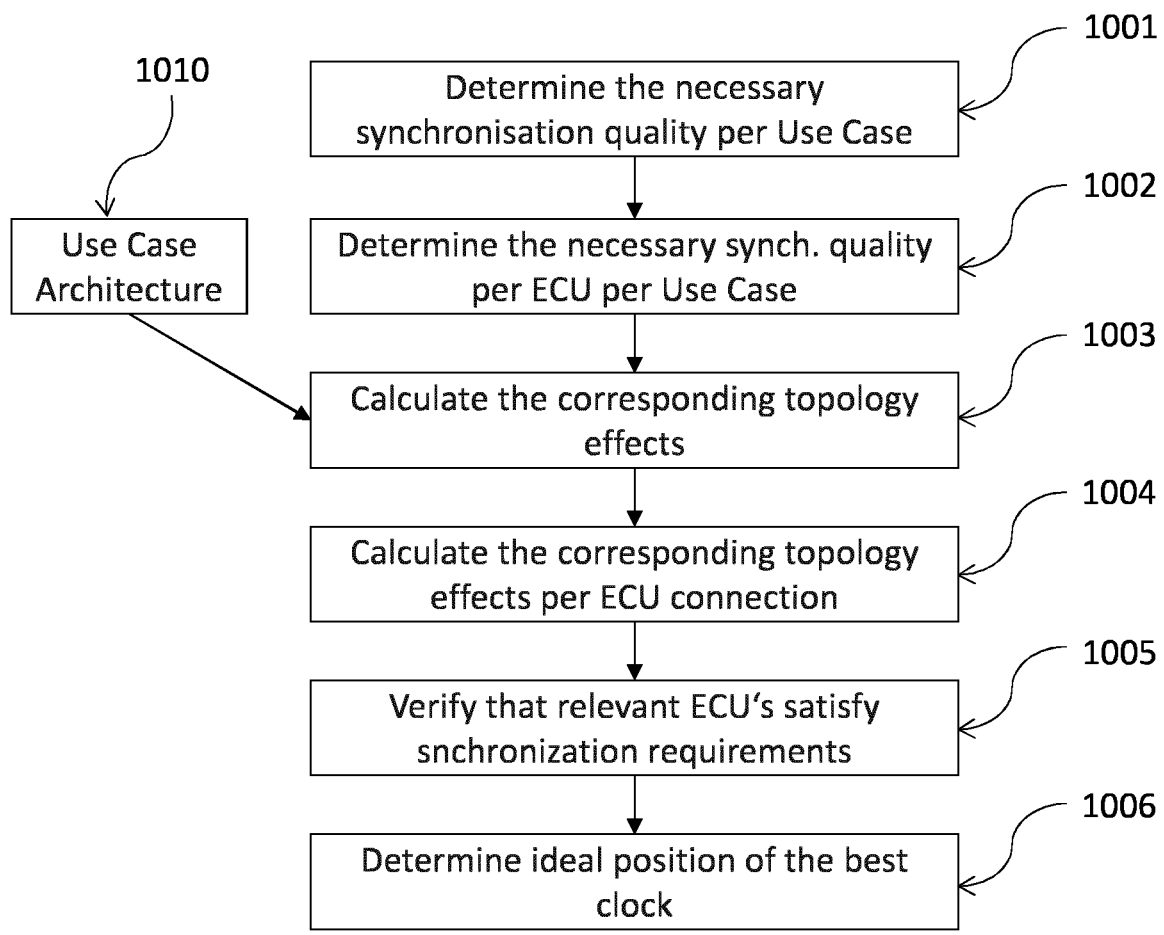
FIG. 10 shows detail of determining which node represents the best clock.

FIG. 10 shows the steps in detail for determining which node represents the best clock. One of the first steps, shown as 1001, is to collect the requirements for clock synchronization for a given use case. Another first step, shown as 1002, is to evaluate the requirements for individual nodes of the network, given the use case. In this example it is shown as an evaluation per ECU. The two evaluation steps for the needed synchronization quality may be combined or done in a different order.

At step 1003 the abstract synchronization requirements of the use case are mapped to the specific architecture. For this, the use case architecture information is provided as an input from step 1010. For example, if a node performs sensor fusion with input from a number of other nodes, then this operation puts requirements on the clock synchronization between the nodes which participate in the sensor fusion. At step 1003, these requirements are mapped to the specific topology which is present. At step 1004 the requirements are analyzed for specific connections between nodes. Steps 1003 and 1004 may also be mixed, or combined as one step.

Figure 11A:
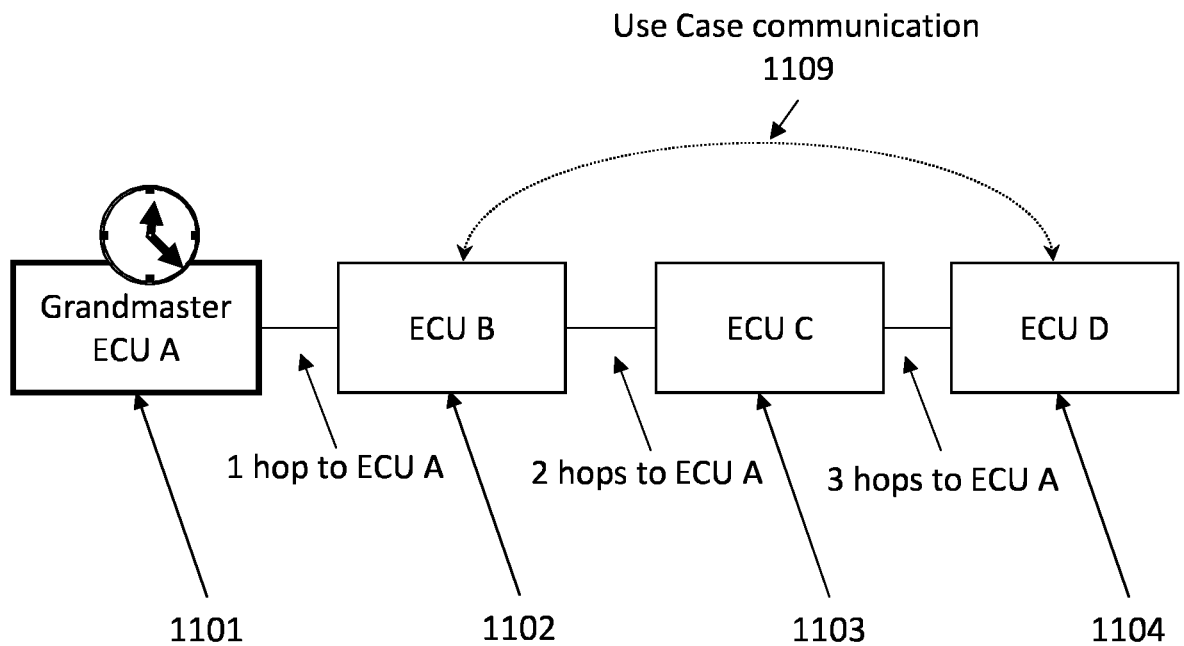
FIGS. 11a and 11b show evaluation of different grandmaster clock positions for a use case.

At step 1005 the requirements of the different nodes are compared and verified. The different requirements as mapped to the topology must be satisfied in order for the system as a whole to operate. If all requirements can be met, then at step 1006 the ideal position for the best clock can be set. This position meets all requirements, and offers the desired synchronization for the use case and the current topology. FIG. 11 show an example of how use case communication plays a role in determining which node should be clock source, i.e. which ECU should be selected as grandmaster. In FIG. 11a is shown a use case communication 1109 between ECU B as node 1102 and ECU D as node

1104. Node 1104 may be e.g. an actuator. The use case communication in this example is determinative, and drives the communication requirements. Thus, in the configuration of FIG. 11a, the ECU D is 3 hops removed from the grandmaster, and the use case communication involves a node which is 3 steps removed from the grandmaster as clock source, as well as ECU B which is only 1 hop removed.

Figure 11B:
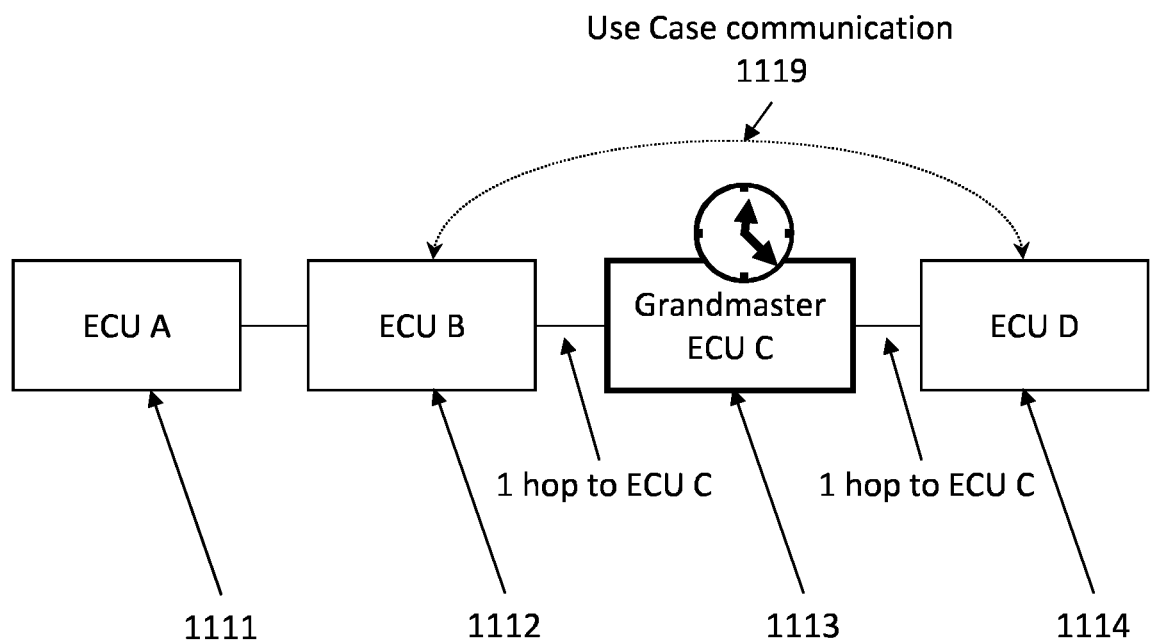

In FIG. 11b the communications topology has been optimized by selecting ECU C as node 1113 to be grandmaster. Thus the clock source is only one hop removed from both nodes of the use case communication 1119, being only one hop from ECU B and one hop from ECU D. Thus, if the use case communication is determinative for the clock synchronization requirements, this system is clearly improved with respect to the clock source of FIG. 11a.

Figure 12:
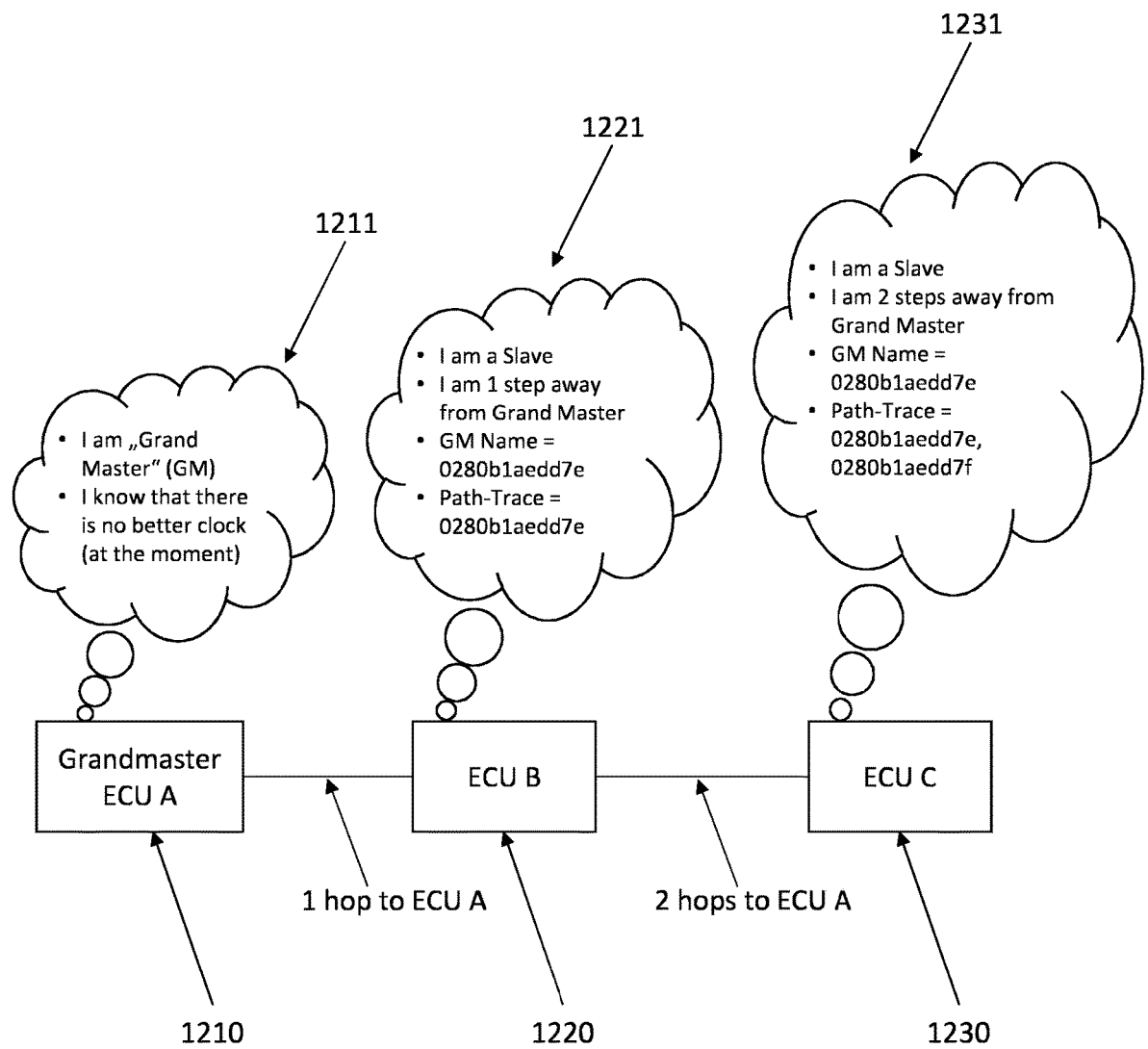
FIG. 12 shows steps to select the best clock.

FIG. 12 shows the information which becomes available to nodes when listening for and receiving announce messages. A message 1211 is sent from grandmaster ECU A 1010. In an embodiment in the context of IEEE 802.1AS, the announce message provides status and characterization information from the grandmaster node that transmitted the message. This information is used by the receiving nodes and end nodes when executing the BMCA.

The announce message makes one hop to ECU B 1220, because ECU B is one step removed from ECU A. ECU B now has the path trace information shown as 1221 including the GM name, the path trace, and the number of steps to the GM. ECU B forwards the message for another hop to ECU C 1230. ECU C now has the path trace information shown as 1231 including the GM name, the path trace, and the number of steps to the GM, which is two steps removed in this example.

Each node can thus collect information about the topology of the network as seen from its own perspective. In particular, each node can evaluate the number of hops to any grandmaster if that node were to become the grandmaster or clock source during operation.

A node which participates as a potential clock source may be a participant or a necessary participant in the evaluation of paths, while a node which cannot be clock source may instead be passive and receive whatever clock information is sent by a current clock. Topology discovery is done by at least one node, which may determine the path to the grandmaster or clock source using the information as shown in FIG. 12.

Figure 13:
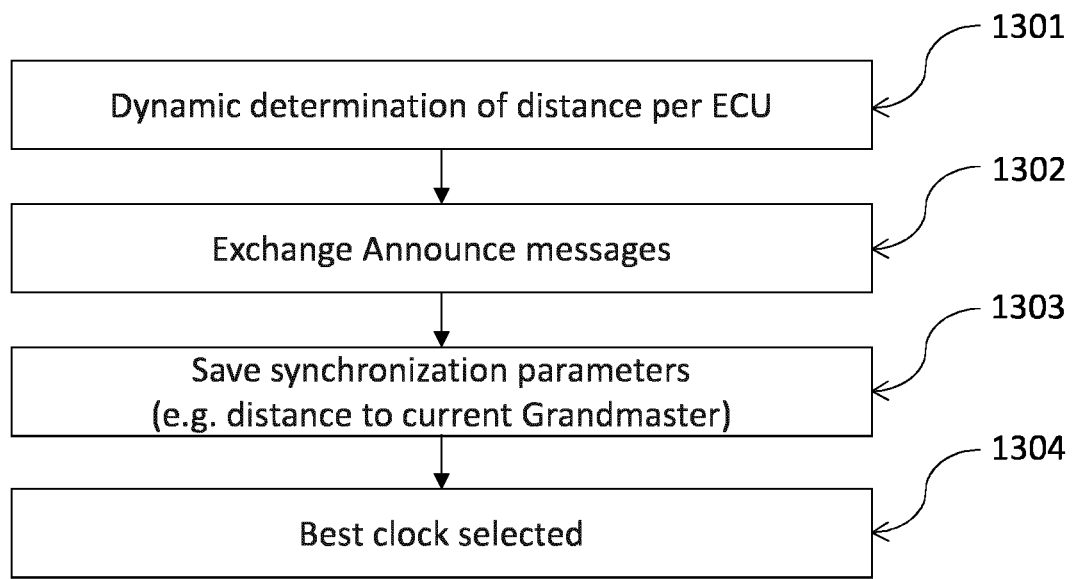
FIG. 13 shows steps for evaluating the network topology.

FIG. 13 shows steps of an embodiment which give an overview of best clock selection. The process starts with a dynamic determination of the distance for each node, or ECU, at step 1301. This can be done with the information as shown in FIG. 12. If e.g. the BMCA Best Master Clock Algorithm is used, then at step 1302 Announce messages are exchanged. The synchronization parameters (as shown in FIG. 12) may then be saved at step 1303. These provide information such as the distance to the current grandmaster. At step 1304 the best grandmaster clock has been selected. Each of the steps may be performed by a software module, or by hardware, or a combination of both.

Figure 14:
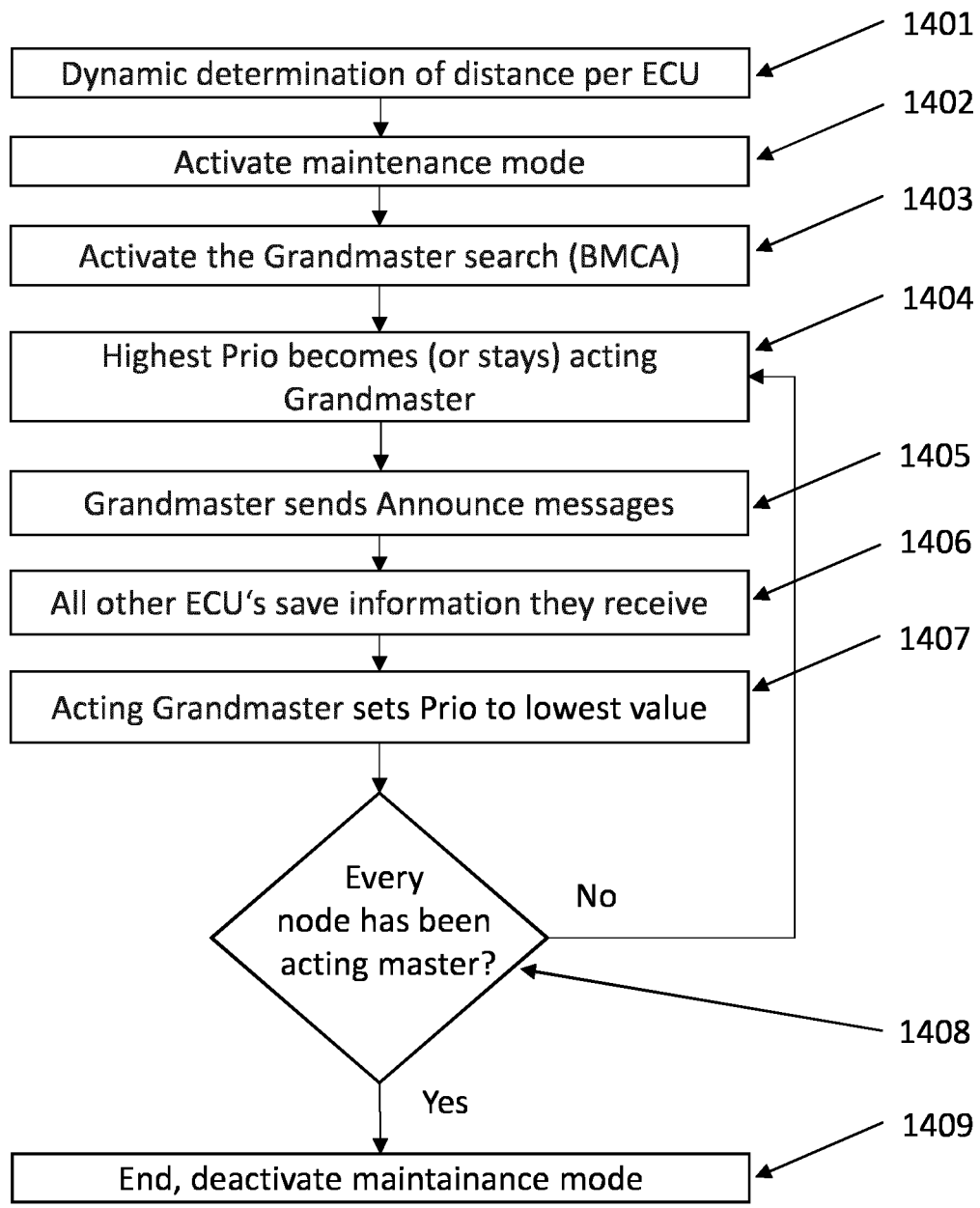
FIG. 14 shows evaluation of contents of a path trace message.

FIG. 14 shows the steps in using a synchronization information exchange protocol like the BMCA Best Master Clock Algorithm, as standardized in IEEE 802.1AS. Each of the steps may be performed by a software module, or by hardware, or a combination of both. The sequence begins with an event 1401 which triggers the topology discovery or topology recognition. The launch of topology discovery can manually triggered, e.g. with a special setup menu or by an external test/diagnose unit. Another possibility is to start automatically e.g. when a new software (e.g. OTA) is loaded. The topology discovery may do a dynamic measuring or determination of distances as steps removed or hops, for each node or ECU.

A maintenance mode may be activated 1402 in order to not affect a vehicle in operation and avoid potential failures. The maintenance mode puts the car is in safe mode, e.g. at the end of the production line or in a workshop. This step may not be needed if for example the standard IEEE 802.1AS-rev operation is used, as the standard allows a parallel time synchronization of several domains. In such a case, one domain can be used for normal operation, and another domain especially for the topology discovery.

The search algorithm to find the best master clock (BCMA) is then started at 1403. In one embodiment this is the master clock selection algorithm of IEEE 802.1AS.

In the first step of a loop at 1404, a unique node is selected. In IEEE 802.1AS, this is the node with the highest priority. The selected node will be called grandmaster. The rule which is used to select a node at the first step of the loop, must insure that each node which can become clock source or grandmaster (for example, which has the capabilities) is selected at least once. For efficiency considerations, it is better that a node which has been selected once is not selected again.

In a next step of the loop, the acting grandmaster sends announce messages 1405, which provide status and characterization information from the grandmaster node that transmitted the message. This information is used by the receiving nodes and end nodes when executing the BMCA. The nodes of the network must extract topology information from the announce messages they receive and save the information at step 1406. Examples from an embodiment with the information that nodes receive is presented together with FIG. 12. Information to be extracted may include the path to another node, the port which connects to that path, and the number of steps the node is removed when using the given port. When the acting grandmaster node has completed sending announce messages to other nodes, it then retires itself to no longer be selected as the acting grandmaster in step 1407. It does this in the context of IEEE 802.1AS by setting its priority to the lowest possible value. In this way, each other node will have a higher priority and will become acting grandmaster, or no other node will become grandmaster and the discovery loop will complete. As indicated above, the rule which is used must insure that each node which can become clock source or grandmaster, is selected at least once.

In step 1408 is evaluated whether a node with priority can become grandmaster. If every node has been acting clock source and then retired itself, for example in that it set its priority such that it no longer will become grandmaster, then the loop finishes, otherwise the loop returns to step 1404 with the highest priority node becoming grandmaster.

If every node, or at least every node which may act as a clock source or grandmaster, has sent announce messages, then the sequence ends at step 1409. When all selectable nodes have been selected, then the best clock selection process has completed and a set of feasible clock sources has been generated. If no node manifests itself as a priority node to become acting grandmaster, this is an indication that the search algorithm has completed. For example, a timeout may be generated if there is no priority node, and then the search is terminated. If a maintenance mode was activated, then the maintenance mode should be deactivated here. We will not consider failure conditions, lost connections, etc., which may also lead to a situation where no node answers or where it seems to one node that no other node answers.

In one embodiment, all nodes of a network may be selectable, as each node is capable of being acting grandmaster, or because each node is potentially a best clock source for the network. In another embodiment, only some nodes may be capable of being acting grandmaster, and so only some nodes may be selectable. In another embodiment, certain nodes may not be selectable because they are to remain hidden, or for other reasons such as to avoid timing loops.

The minimum number of cycles through the loop of FIG. 14 is given by the number of "known" nodes, excluding those nodes which may never be grandmaster (GM). Any loop process and best clock search algorithm must consider the possibility of hidden nodes. Likewise, deadlock prevention at the start of operation may require all nodes—or at least those which are grandmaster capable—to assume they are best master clock, and to send announce messages. This may mean that many nodes send announce messages simultaneously until an acting grandmaster has been selected.

Figure 15:
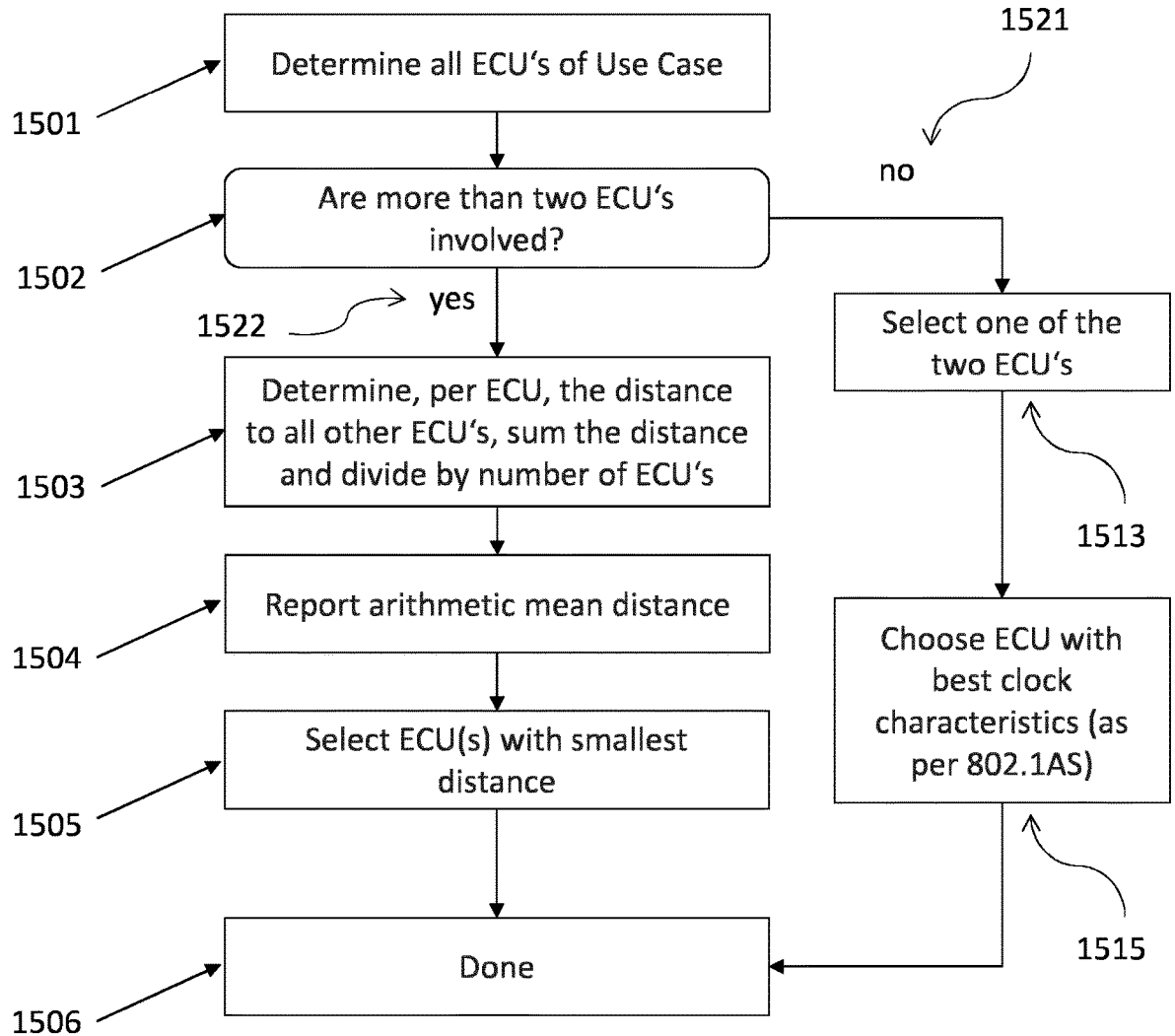
FIG. 15 shows evaluation of best clock based on topology and hop count.

FIG. 15 shows one embodiment as an example of the evaluation leading to the selection of the best clock source from the set of feasible clock sources based on topology and hop count. The process begins at step 1501 with identifying all nodes, here labeled ECU's, which will require synchronization or clock information as part of a use case which is to be prepared. At step 1502, one or more of the nodes, as representative of the network, check how many ECU's will be involved in the selection process. If multiple nodes are involved as feasible clock sources at 1522, then in this embodiment the next step at 1503 is for each participating node or ECU to determine the distance to other nodes (e.g. the number of hops). The node then takes a sum of all distances and divides that by the number of nodes. This distance is reported back to some central location or made centrally available in step 1504. When all participating nodes report the distance divided by node count, it forms a compilation of arithmetic mean distance by node for that ECU as a clock source. In this embodiment the node or nodes with the smallest mean distance will be selected from the set of feasible clock sources; in other embodiments, other criteria related to the use case may be used to select the best clock. In one embodiment, the clock source the node with the smallest number of hops to a node or to certain nodes or all nodes will be selected.

If only two ECU's or nodes are involved, at 1521, then at the next step 1513 it will be one of two nodes which is selected. In this embodiment the node with the best clock characteristics will be selected; these might be the clock characteristics specified in IEEE 802.1AS. In other embodiments, other criteria related to the use case may be used to select the best clock.

Once a best clock has been selected as clock source by the steps 1505 or 1515, the selection process finishes at step 1506. This may occur as described for step 1408, for example that no node responds and a timeout event occurs.

The number of steps (or hops) between the nodes may be fixed at one point in time, for example at production or delivery. Or the number of steps in the topology may change. The topology may change e.g. because of a failure in a node or a fault in the topology, either transient or permanent. Or the topology may change due to a software update such as an OTA update, or because hardware is added to or removed from the topology. The topology may change for a limited time or on a recurring basis; for example, partial networking may be used to save power, shutting down parts of the network. In an embodiment in the context of an IEEE 802.1AS network, the network may configure and segment itself autonomously. Due to the cyclical implementation of the BMCA (Best master Clock Algorithm), participant nodes may also be connected or removed during runtime, i.e. dynamically.

The context of an IEEE 802.1AS network for automotive environments is given as a preferred embodiment. However, it should be clear to the person of skill that the inventive concept can be implemented in other networks and for other environments such as industrial Use Cases.

The invention claimed is:

1. A method for establishing an improved clock topology for a computation system, the computation system being a network of nodes, and multiple ones of the nodes are capable of being a grandmaster clock source, which comprises the steps of:
sequentially selecting each selectable node of the nodes as an acting grandmaster node;
the acting grandmaster node sending announce messages;
each of the nodes with a determinative communication requirement extracting topology information from the announce messages; and
repeating the above steps with another node of the nodes until each said selectable node has been the acting grandmaster node, and then selecting a clock source from a set of feasible clock sources based on a best clock topology for a set of the nodes with determinative communication requirements, wherein the best clock topology is based on an evaluation of the topology information that was extracted from the announce messages by each of the nodes.

2. The method of claim 1, wherein the network of the nodes is a network of automotive electronic control units (ECUs).

3. The method according to claim 1, wherein the step of selecting the clock source includes selecting a node of the nodes with a lowest arithmetic mean distance as the clock source.

4. The method according to claim 1, wherein the step of selecting the clock source includes selecting a node of the nodes with a smallest number of hops to a node or to the nodes with a determinative communication.

5. The method according to claim 1, wherein a best clock selection process uses a best master clock algorithm (BMCA) of IEEE 802.1AS (Institute of Electrical and Electronic Engineers 802.1 Active Standard).

6. The method according to claim 3, wherein a message announcing clock capabilities of the acting grandmaster node is an announce message of IEEE 802.1AS (Institute of Electrical and Electronic Engineers 802.1 Active Standard).

7. The method according to claim 1, wherein starting a best clock selection process includes sending at least four messages announcing clock capabilities of the acting grandmaster node or sending exactly four messages announcing the clock capabilities of the acting grandmaster node.

8. The method according to claim 1, wherein the node which is the acting grandmaster node changes its priority to a lowest priority after being the acting grandmaster node.

9. The method according to claim 1, wherein the acting grandmaster node sends at least one synchronization message before sending a message to announce its capabilities.

10. A node comprising: a controller configured and adapted for use in a computation system, the computation system being a network of nodes, and multiple ones of the nodes being capable of being a grandmaster clock source, the node configured to:

being sequentially selected as an acting grandmaster node;

send announce messages when functioning as the acting grandmaster node;

extract topology information from the announce messages; and select a clock source from a set of feasible clock sources based on a best clock topology for a set of the nodes with determinative communication requirements, wherein the best clock topology is based on an evaluation of the topology information that was extracted from the announce messages by each of the nodes.

11. The node according to claim 10, wherein the node is an automotive electronic control unit (ECU).

12. The node according to claim 10, wherein the node contains at least one Ethernet interface.

13. The node according to claim 10, wherein the node contains a plurality of interfaces.

14. The node according to claim 10, wherein the node contains at least one interface which is not an Ethernet interface.

15. The node according to claim 10, wherein the node contains a precision clock source.

* * * * *